United States Patent
Montero

(10) Patent No.: US 10,938,254 B2
(45) Date of Patent: Mar. 2, 2021

(54) SECURE WIRELESS CHARGING

(71) Applicant: Dell Products, L.P., Round Rock, TX (US)

(72) Inventor: Adolfo S. Montero, Pflugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 157 days.

(21) Appl. No.: 16/224,599

(22) Filed: Dec. 18, 2018

(65) Prior Publication Data

US 2020/0195061 A1    Jun. 18, 2020

(51) Int. Cl.
*H02J 50/80* (2016.01)
*H02J 7/02* (2016.01)
*H04L 9/32* (2006.01)
*G06F 21/44* (2013.01)

(52) U.S. Cl.
CPC .............. *H02J 50/80* (2016.02); *G06F 21/44* (2013.01); *H02J 7/025* (2013.01); *H04L 9/3213* (2013.01)

(58) Field of Classification Search
CPC ........... H02J 50/80; H02J 7/025; G06F 21/44; H04L 9/3213
USPC ......................................................... 307/104
See application file for complete search history.

(56) References Cited

U.S. PATENT DOCUMENTS

| | | | | |
|---|---|---|---|---|
| 2002/0054334 A1* | 5/2002 | Harrison | ............... | H04L 9/3263 358/1.15 |
| 2009/0222658 A1* | 9/2009 | Sandhu | ................ | H04L 9/3213 713/156 |
| 2011/0246774 A1* | 10/2011 | Phillips, II | .......... | H04L 63/0442 713/168 |
| 2015/0052063 A1* | 2/2015 | Feraud | ...................... | G10F 1/18 705/71 |
| 2015/0365394 A1* | 12/2015 | Fitch | ......................... | H04L 9/32 726/7 |
| 2016/0105286 A1* | 4/2016 | Li | .......................... | H04L 9/0894 380/286 |
| 2017/0302635 A1* | 10/2017 | Humphries | ........... | H04L 63/083 |
| 2017/0302696 A1* | 10/2017 | Schutz | ...................... | H04L 9/30 |
| 2018/0062858 A1* | 3/2018 | Xu | ....................... | H04L 63/0428 |
| 2019/0188704 A1* | 6/2019 | Grendon | ............ | G06Q 20/3674 |
| 2019/0253262 A1* | 8/2019 | Smith | ..................... | H04L 63/062 |
| 2019/0268154 A1* | 8/2019 | Lerner | ................ | H04L 63/0457 |
| 2019/0296799 A1* | 9/2019 | Park | ......................... | H02J 50/10 |
| 2020/0028383 A1* | 1/2020 | Bennett | ................ | H04B 5/0031 |

(Continued)

*Primary Examiner* — Daniel J Cavallari
*Assistant Examiner* — Brian K Baxter
(74) *Attorney, Agent, or Firm* — Fogarty LLP

(57) ABSTRACT

An IHS (Information Handling System) may be charged via a wireless power coupling between components of a charging pad and components of the IHS. An IHS may be vulnerable to malicious and unsupported charging pad operations that may result in unsafe conditions or damage. Embodiments provide for authentication of wireless charging systems. A first token is transmitted to a wireless power reception unit (PRU) where it is encrypted using a private key of the wireless PRU. The wireless PRU is authenticated if decryption of a response from the PRU results in recovery of the first token. A second token is transmitted to a wireless power transmission unit (PTU) where it is encrypted using a private key of the wireless PTU. The wireless PTU is authenticated if decryption of a response from the PTU results in recovery of the second token.

17 Claims, 4 Drawing Sheets

(56) References Cited

U.S. PATENT DOCUMENTS

2020/0099667 A1* 3/2020 Parthasarathy ......... H04L 51/12
2020/0111095 A1* 4/2020 Osborn .............. G06Q 20/3674
2020/0154275 A1* 5/2020 Louis .................. H04W 12/001

* cited by examiner

SECURE WIRELESS CHARGING

FIELD

This disclosure relates generally to Information Handling Systems (IHSs), and more specifically, to providing secure wireless charging of IHSs.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Portable IHSs utilize rechargeable batteries that, until recently, were typically charged by coupling a wired power connection to a power port of the IHS. More recently, certain IHSs support wireless charging in which power is transferred to the IHS via a wireless coupling between wireless charging components of the IHS and wireless charging components of a charging pad on which the IHS is placed on or near. This wireless coupling between the IHS and the charging pad may expose an IHS to certain vulnerabilities of the charging pad. As IHSs are increasingly charged via public charging pads, IHSs will also be increasingly vulnerable to malicious wireless charging systems.

SUMMARY

In various embodiments, method may be used to authenticate components of a wireless charging system. The methods include: transmitting a first token to a wireless power reception unit (PRU); encrypting the first token using a private key of the wireless PRU, wherein the private key is encoded within cryptographic logic of the wireless PRU; authenticating the wireless PRU based on a decryption resulting in recovery of the first token; transmitting a second token to a wireless power transmission unit (PTU); encrypting the second token using a private key of the wireless PTU, wherein the private key is encoded within cryptographic hardware logic of the wireless PTU; and authenticating the wireless PTU based on a decryption resulting in recovery of the second token.

Additional method embodiments further include terminating power to the wireless PRU when the decryption does not result in recovery of the first token. Additional method embodiments further include authorizing wireless charging by the wireless PTU at a reduced power level when the decryption does not result in recovery of the second token. In additional method embodiments, the wireless PTU and the wireless PRU are authenticated by an embedded controller of an IHS receiving power from the wireless PRU. In additional method embodiments, the embedded controller transmits the first token to a microcontroller of the wireless PRU and wherein the wireless PRU transmits the second token to a microcontroller of the wireless PTU on behalf of the embedded controller. Additional method embodiments further include transmitting, by the embedded controller, a first firmware payload to the wireless PRU; and transmitting, by the wireless PRU on behalf of the embedded controller, a second firmware payload to the wireless PTU. In additional method embodiments, the first firmware payload is encrypted using a private key generated by the embedded controller and provided to the microcontroller of the wireless PRU via a secure key exchange.

In various additional embodiments, an Information Handling System (IHS) is configured for authenticating components of a wireless charging system. The IHS includes: a wireless power reception unit (PRU) operable to receive a wireless power transfer from a wireless power transmission unit (PTU); an embedded controller operable to: transmit the first token to the wireless PRU; receive an encrypted first token from the wireless PRU, wherein the first token is encrypted by the wireless PRU using a first private key encoded within cryptographic hardware logic of the wireless PRU; authenticate the wireless PRU based on a decryption of the encrypted first token resulting in recovery of the first token; transmit a second token to the wireless PTU; receive an encrypted second token from the wireless PTU, wherein the second token is encrypted by the wireless PTU using a second private key encoded within cryptographic hardware logic of the wireless PTU; and authenticate the wireless PTU based on a decryption of the encrypted second token resulting in recovery of the second token.

In additional IHS embodiments, the embedded controller is further operable to: terminate power to the wireless PRU when the decryption of the encrypted first token does not result in recovery of the first token. In additional IHS embodiments, the embedded controller is further operable to: authorize wireless charging by the wireless PTU at a reduced power level when the decryption does not result in recovery of the second token. In additional IHS embodiments, the embedded controller transmits the first token to a microcontroller of the wireless PRU and wherein the wireless PRU transmits the second token to a microcontroller of the wireless PTU on behalf of the embedded controller. In additional IHS embodiments, the embedded controller is further operable to: transmit a first firmware payload to the wireless PRU; and transmit a second firmware payload to the wireless PRU, wherein the second firmware payload is forwarded to the wireless PTU by the wireless PRU. In additional IHS embodiments, the first firmware payload is encrypted using a private key generated by the embedded controller and provided to the microcontroller of the wireless PRU via a secure key exchange.

In various additional embodiments, a system authenticates wireless charging components. The system includes: a wireless power reception unit (PRU) operable to receive a wireless power transfer from a wireless power transmission unit (PTU), and further operable to encrypt tokens using a first private key encoded within cryptographic hardware of the wireless PRU; the wireless PTU operable to encrypt tokens using a second private key encoded within cryptographic hardware of the wireless PTU; an embedded controller operable to: transmit the first token to the wireless PRU; receive, from the wireless PRU, the encrypted first token; authenticate the wireless PRU based on a decryption of the encrypted first token resulting in recovery of the first token; transmit the second token to the wireless PTU; receive, from the wireless PTU, the encrypted second token; and authenticate the wireless PTU based on a decryption of the encrypted second token resulting in recovery of the second token.

In additional system embodiments, the embedded controller is further operable to: terminate power to the wireless PRU when the decryption of the encrypted first token does not result in recovery of the first token. In additional system embodiments, the embedded controller is further operable to: authorize wireless charging by the wireless PTU at a reduced power level when the decryption does not result in recovery of the second token. In additional system embodiments, the embedded controller transmits the first token to a microcontroller of the wireless PRU and wherein the wireless PRU transmits, on behalf of the embedded controller, the second token to a microcontroller of the wireless PTU. In additional system embodiments, the embedded controller is operable to: transmit a first firmware payload to the wireless PRU; and transmit a second firmware payload to the wireless PRU, wherein the second firmware payload is forwarded to the wireless PTU by the wireless PRU. In additional system embodiments, the first firmware payload is encrypted using a first shared key generated by the embedded controller and provided to the microcontroller of the wireless PRU via secure key exchange. In additional system embodiments, the second firmware payload is encrypted using a second shared key generated by the embedded controller and provided, by the wireless PRU acting on behalf of the embedded controller, to the microcontroller of the wireless PTU via secure key exchange.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

As described above, an IHS may be charged via a wireless power coupling between components of a charging pad and components of the IHS. An IHS may be vulnerable to malicious charging pad operations. For instance, charging pad firmware may be configured to exceed power transfer limits beyond design limits or to force battery charging operations of the IHS into unsafe regions. Such malicious operations by a wireless charging system may render an IHS inoperable and/or create unsafe conditions for users though excessive heat and battery malfunctions. The lack of any mechanical interface allows a charging pad to be used in charging a wide variety of wireless IHSs. Users of IHSs supporting wireless charging can be expected to attempt, either purposefully or inadvertently, to charge their wireless IHSs using unsupported charging pads. Use of unsupported charging pads may subject the IHS to unsafe conditions since such charging pads have not been validated for safe charging of the user's IHS. In order to address such concerns, embodiments provide authentication of the wireless charging pad, as well as the wireless charging system of the IHS. Embodiments additionally provide a technique for securely updating charging pad firmware.

Figure 1:
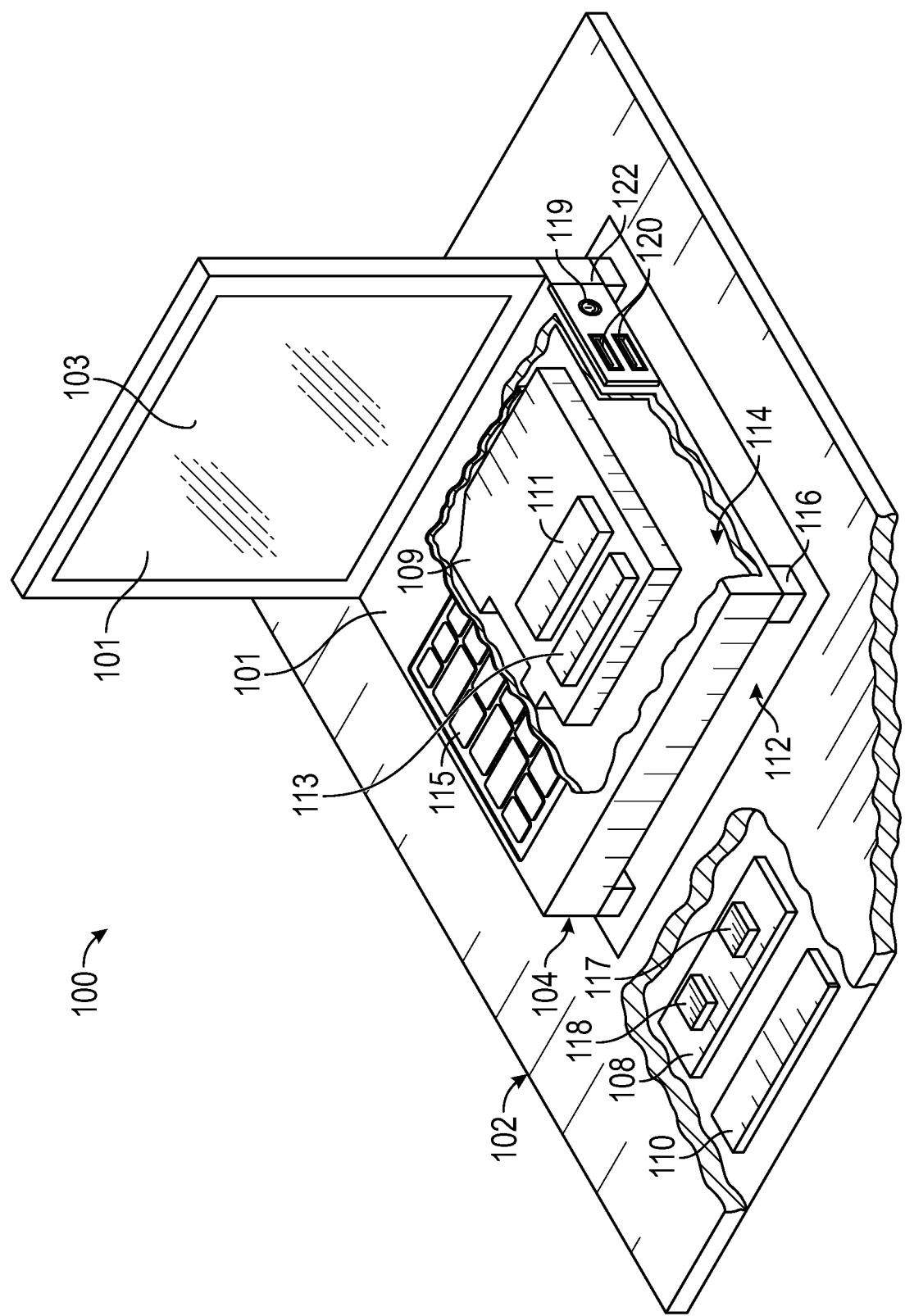
FIG. 1 is an illustration depicting certain components of a system for wireless charging of rechargeable batteries utilized by an IHS.

FIG. 1 is an illustration depicting certain components of a wireless charging system 100 for charging and powering an IHS 101. In the illustrated embodiment, IHS 101 is a laptop computer, that includes a display portion 103, that may be a touchscreen, and a chassis base 104. In the illustrated embodiment, the chassis base 104 houses the main hardware of the IHS 101, such as the motherboard, processor(s), storage drives, system memory and the various non-display sub-systems utilized by the IHS 101. The chassis base 104 may also support a mechanical keyboard 115 that is incorporated into the chassis base 104.

Instead of a mechanical keyboard being incorporated into the chassis base 104, in certain other embodiments, the chassis base 104 and display portion 103 of IHS 101 may both include displays. Both such displays may be touchscreen displays capable of detecting finger gestures and stylus inputs. In embodiments where a touchscreen display is incorporated into the chassis base 104, a soft keyboard may be displayed within this touchscreen display and used to operate IHS 101. In certain embodiments, a physical keyboard may also be wirelessly coupled to the IHS 101 and used to operate IHS 101.

In certain embodiments, IHS 101 may be a 2-in-1 hybrid computer that includes a display portion 103, such as a touchscreen, and a chassis base 104. In such embodiments, the 2-in-1 IHS 101 may be converted between a conventional laptop configuration, a tablet configuration and various hybrid configurations. Although FIG. 1 illustrates a laptop embodiment, in other embodiments, IHS 101 may be a tablet device or a mobile phone device. Embodiments may be comprised within any form of IHS that supports wireless charging.

As illustrated in FIG. 1, an IHS 101 may be charged via a wireless charging pad 102 that transfers energy to a wireless power reception unit (PRU) 109 of IHS 101, such as via an inductive coupling between the wireless PRU 109 and a corresponding wireless power transmission unit (PTU) 108 of the charging pad 102. In various embodiments, wireless charging pad 102 and wireless PRU 109 may utilize different power transfer technologies in addition to or instead of inductive coupling, such as resonant inductive coupling, capacitive coupling and beamed power transfer, such as laser or microwave transfer.

As described in additional detail below, wireless charging sessions between the wireless PRU 109 of IHS 101 and the charging pad may be secured via a handshake procedure that authenticates both the wireless PRU 109 as well as the corresponding wireless PTU 108 of the charging pad 102. Also described below, an IHS 101 according to embodiments may be configured to securely distribute updated firmware to the wireless PRU 109 of the IHS as well as to the wireless PTU 108 of the charging pad 102.

As illustrated, the wireless PTU 108 may be incorporated within charging pad 102. The wireless PTU 108 may include a coil element that receives a power source, such as a regulated DC voltage, and induces a corresponding voltage in a coil element of the wireless PRU 109 of the IHS 101. As described in additional detail with regard to FIGS. 2 and 3, wireless PTU 108 may also include a microcontroller 117 that executes firmware instructions in order to implement the wireless charging operations supported by the charging pad 102. Wireless PTU 108 may also include a cryptographic hardware module 118 that may provide a secure resource that may be used in the authentication of the microcontroller 117. In certain embodiments, the wireless PRU 109 may similarly include a microcontroller 111 that implements wireless charging operations and a cryptographic hardware module 113 used in the authentication of both the wireless PRU 109 and the wireless PTU 108. Charging pad 109 may also include a wireless communications controller 110 that may be configured to establish a communication session with a corresponding wireless interface of the IHS 101 in support of wireless charging operations.

In FIG. 1, wireless PTU 108 is located near the edge of charging pad 102 for purposes of illustration. In embodiments, wireless PTU 108 may be located near the center of a landing pad 112 portion of the charging pad 102 on which IHS 101 is placed properly oriented in order to align the wireless PTU 108 of the charging pad 102 and the wireless PRU 109 of the IHS 101. As illustrated, the chassis base 104 of IHS 101 may include spacers 116 that may promote alignment of the wireless charging components while also creating an air gap between the bottom surface of IHS 101 and charging pad 102, thus promoting efficient cooling of IHS 101.

As illustrated, the chassis base 104 may include a power port 119 that may receive a DC input voltage. The chassis base 104 may also include various USB C connectors 120 that may each receive a USB cable for coupling a variety of devices to the IHS 101. The USB connectors 120 may support two-way power transfer such that IHS 101 can alternately receive power from or transfer power to an external device coupled to the USB connectors 120.

Figure 2:
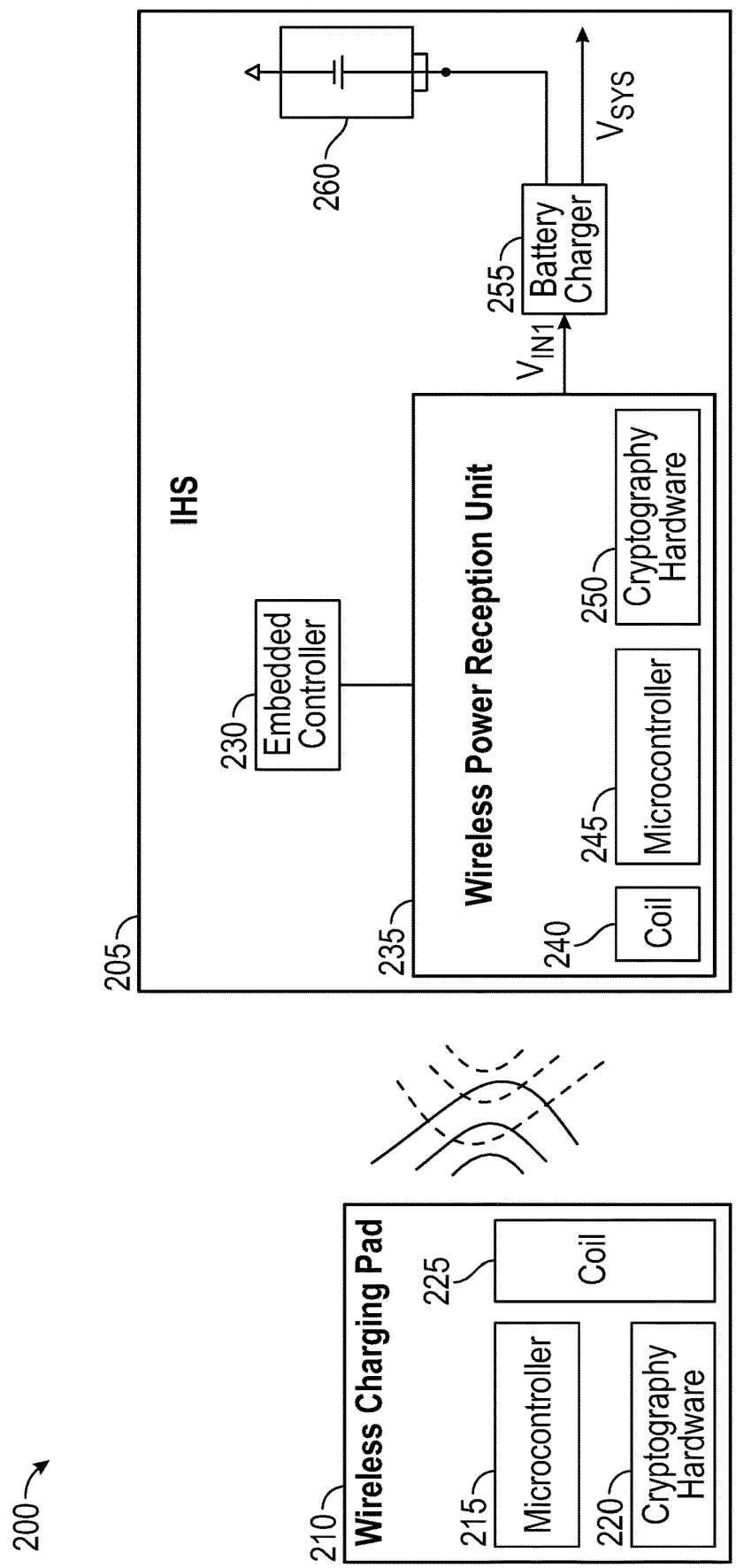
FIG. 2 is a block diagram illustrating certain components of a system according to various embodiments for providing secure wireless charging of IHSs.

FIG. 2 is a block diagram illustrating certain components of a wireless charging system 200 for providing power to an IHS 205 that includes a rechargeable battery 260 and a battery charging system 255. The IHS 205 may include a wireless PRU 235 that receives a transfer of power from wireless PTU 210, such as via an inductive coupling between coil element 225 of the wireless charging pad and a corresponding coil element 240 of the wireless PRU 235. The voltage, $V_{IN1}$, generated by the wireless PRU 235 may then be used by the battery charger 255 to provide a system voltage and/or charge battery 260.

As described, the wireless power coupling of the IHS 205 to the wireless charging pad 210 may expose the IHS to certain vulnerabilities of the charging pad. In particular, malicious actors may configure a wireless charging pad 210 to trigger unsafe and/or damaging power transfers to the IHS 205. Accordingly, embodiments provide techniques for authenticating a wireless PRU 235 and a wireless PTU 210 in order to restrict wireless charging of IHS 205 to legitimate wireless charging systems. Embodiments may authenticate the wireless PRU 235 in order to ensure the local wireless charging components have not been compromised and may authenticate the wireless PTU 210 to ensure a compatible and uncompromised wireless charging pad 210 is being utilized.

In certain embodiments, these wireless charging authentication procedures may be implemented by an embedded controller 230 of IHS 205. For instance, as described with regard to FIG. 3, embedded controller 230 may distribute unique tokens to the wireless PRU 235 and to the wireless PTU 210. The unique tokens are received by microcontrollers 215 and 245 that implement the wireless charging operations by the charging pad and the IHS, respectively. Each of the microcontrollers 215 and 245 may rely on cryptographic hardware modules 220 and 250 to encode the received tokens. In certain embodiments, the cryptographic hardware modules 220 and 250 may be implemented as systems-on-chips, FPGAs, processor functions and/or other hardware logic. Cryptographic hardware modules 220 and 250 may support various cryptographic hardware operations and may be relied on as trusted authentication resources that are not corruptible without physical access to the modules 220 and 250.

Figure 3:
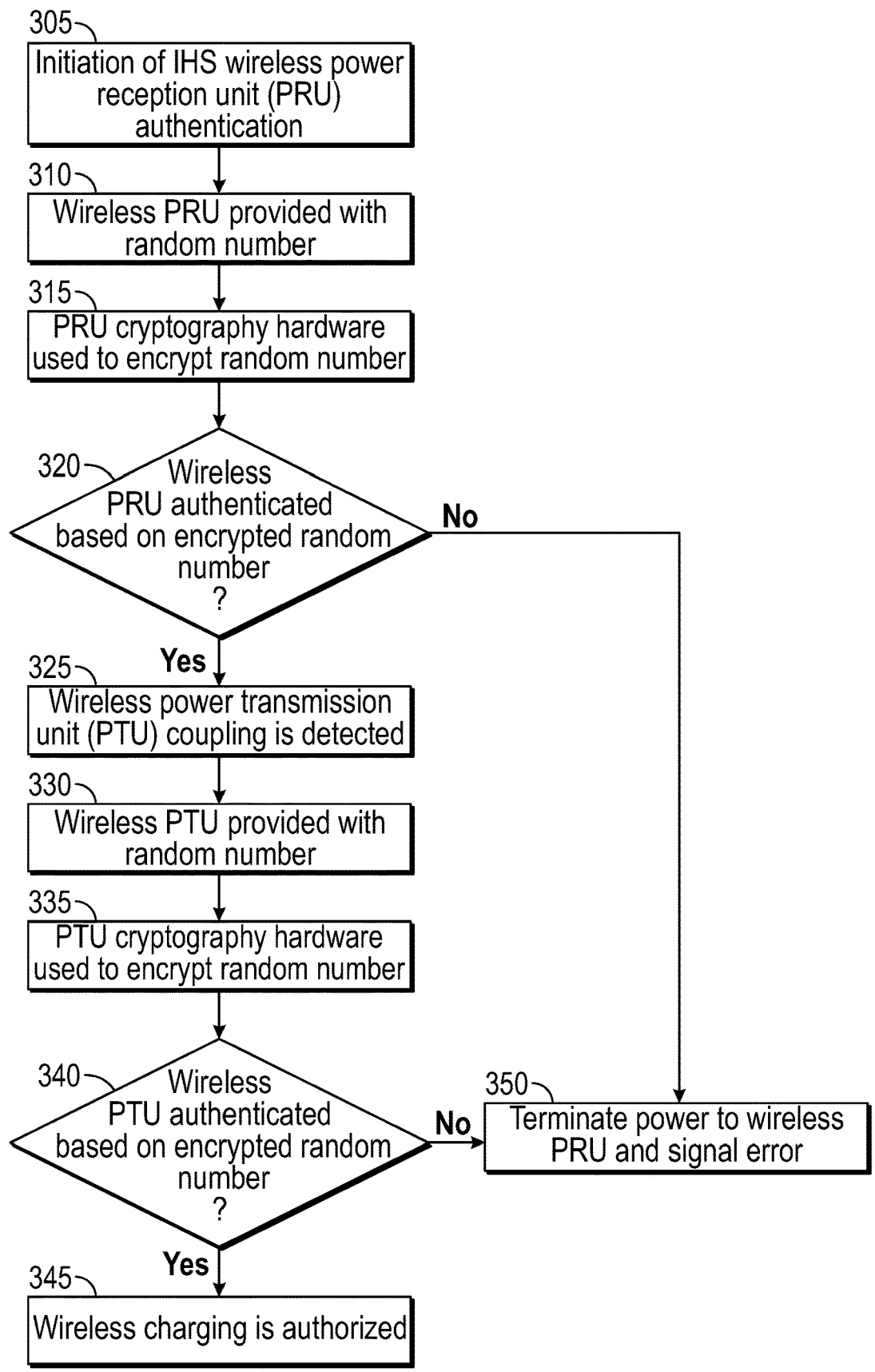
FIG. 3 is flowchart diagram of certain steps of a method according to various embodiments for providing secure wireless charging of IHSs.

FIG. 3 is flowchart diagram of certain steps of a method according to various embodiments for providing secure wireless charging of IHSs. In certain embodiments, the method begins at block 305 with the authentication of the wireless power reception unit utilized by the IHS, such as the wireless power reception unit 235 of FIG. 2. As described, in certain embodiments, the wireless power reception unit may be authenticated by a trusted embedded controller of the IHS. At block 310, the authentication of the wireless power reception unit may be initiated by issuing an authentication command to one or more microcontrollers utilized by the wireless power reception unit (PRU) of the IHS, where the authentication command may include a unique token, such as a random number (RND1).

As described with regard to FIG. 2, the wireless power reception unit 235 may include a cryptographic hardware module, such as a system-on-chip, that may support various cryptographic functions and may include various hardcoded cryptographic keys. At block 315, the microcontroller of the PRU may provide the unique token (RND1) to the cryptographic hardware of the PRU. The unique token may then be encrypted using a private key assigned to the PRU. In certain embodiments, the private key assigned to the PRU may be encoded within the hardware logic of the cryptographic module of the PRU, thus protecting the private key from tampering.

Upon encryption of the unique token (RND1) by the cryptographic hardware of the PRU, the encrypted token is transmitted by the microcontroller of the PRU to the embedded controller. At block 320, the embedded controller utilizes a public key corresponding to the PRU to decrypt the encrypted token received from the PRU. If the decrypted token matches the original unique token (RND1), the PRU is determined to be an authentic wireless charging component. If, however, the decrypted token does not match the original unique token (RND1), the embedded controller may signal, at block 350, an error condition and may also terminate power to the PRU in order to prevent any wireless charging operations by the unrecognized wireless charging component.

In certain embodiments, failure to recover the original unique token (RND1) may result in the embedded controller nonetheless authorizing charging via the non-authenticated wireless PTU, but may require the wireless charging to be conducted at a reduced power level. In certain embodiments, the embedded controller may utilize one or more power limits that may be applied in scenarios where the PTU is not successfully authenticated. For instance, an intermediate power level may be selected when the PTU is not successfully authenticated, but the PTU is determined to be compatible with charging protocols that minimize the possibility of damaging charging operations. The lowest power level may be selected in scenarios where the PTU is not authenticated and no compatibility information is available for the PTU.

If the PRU is authenticated, at block 325, the coupling of a wireless PTU may be detected. In certain embodiments, the coupling of a wireless PTU may be identified based on the detection of a power transfer or of a power transfer signature emitted by the PTU. In other embodiments, the coupling of a wireless PTU may be identified based on wireless communication signals broadcast by a transceiver incorporated into the charging pad and configured to broker wireless power operations on behalf of the wireless PTU. Upon detecting wireless power availability, at block 330, the embedded controller may provide the wireless PTU with another unique token, such as a random number (RND2). In certain embodiments, the embedded controller provides the unique token (RND2) to a microcontroller of the authenticated wireless PRU along with a command directing the wireless PRU to initiate authentication of the PTU.

In response, the microcontroller of the wireless PRU transmits the unique token (RND2) to a microcontroller of the wireless PTU via a wireless data connection between the IHS and the charging pad. Similar to the use of a cryptographic hardware module by the PRU, at block 335, the microcontroller of the PTU relies on a cryptographic hardware module in order to encrypt the unique token (RND2) using a private key assigned to the PTU. In certain embodiments, the private key may be encoded within the cryptographic hardware logic of the PTU. Once the unique token (RND2) has been encrypted using the private key of the PTU, the encrypted token is transmitted from the microcontroller of the PTU to the microcontroller of the PRU via the wireless data connection.

At the PRU, the received encrypted token is forwarded to the cryptographic hardware logic of the embedded controller. At block 340, the embedded controller authenticates the PTU by decrypting the encrypted token using the public key of the PTU in order to recover the unique token (RND2) provided to the PTU. If the unique token (RND2) is not successfully recovered, at block 350 power to the PRU may be terminated and an error condition may be triggered to indicate the wireless charging pad is not authentic. If the unique token (RND2) is successfully recovered by the decryption operations, at block 345, full power wireless charging may be authorized between the authenticated PRU and PTU.

Figure 4:
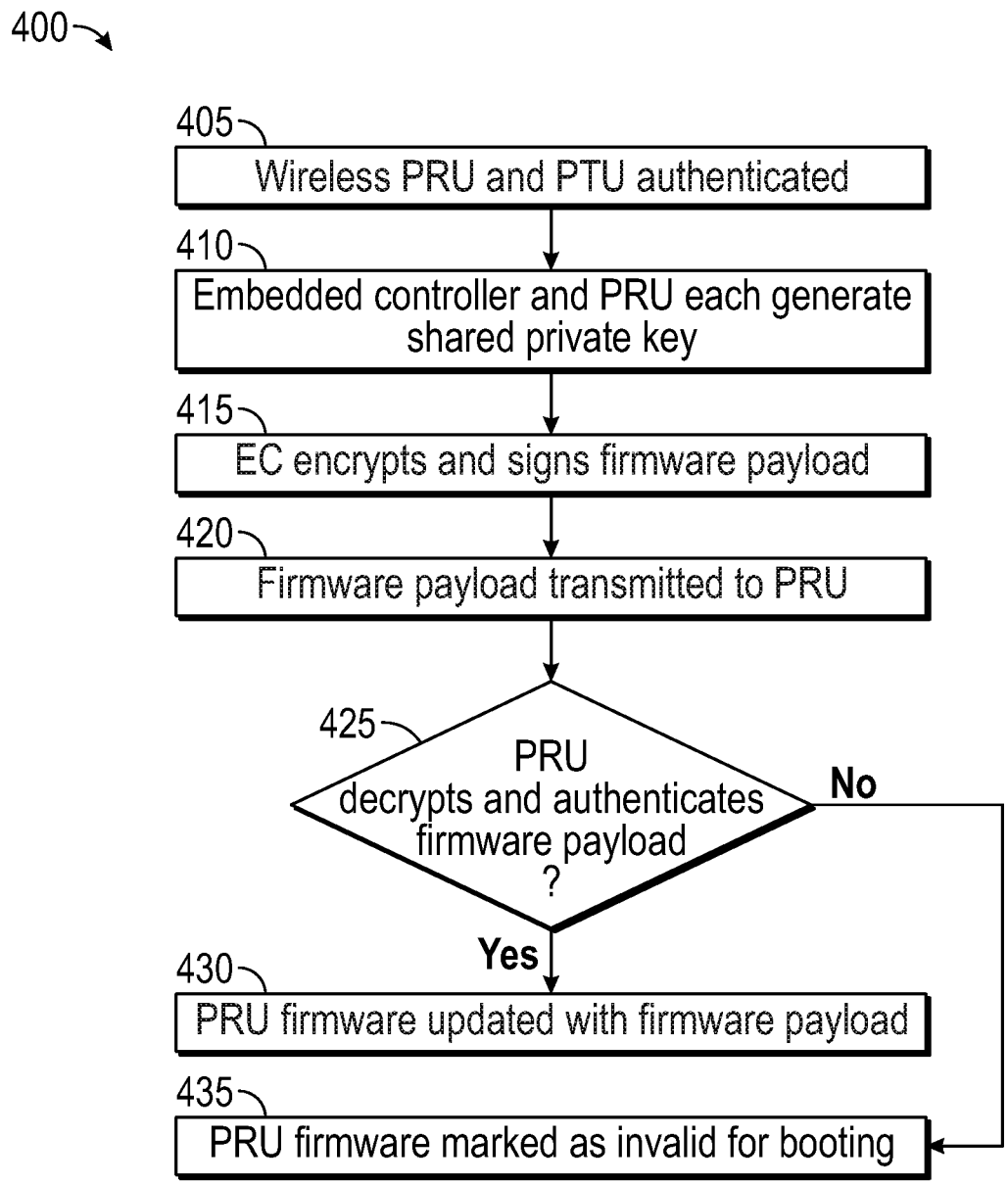
FIG. 4 is flowchart diagram of certain steps of a method according to various embodiments for securely updating the firmware of wireless charging components utilized by IHSs.

FIG. 4 is flowchart diagram of certain steps of a method according to various embodiments for securely updating the firmware of wireless charging components utilized by IHSs. The illustrated embodiment begins at block 405 with authentication of the wireless PRU and the wireless PTU, such as described with regard to the embodiment of FIG. 3. At block 410, the embedded controller initiates a key exchange with the PRU. As described, the wireless PRU may be assigned a private key that may be hardcoded within the cryptographic hardware of the PRU. The embedded controller utilizes the corresponding public key of the PRU in order to authenticate the PRU. The embedded controller may similarly be assigned a private key and a corresponding public key. In certain embodiments, the embedded controller may utilize a key exchange procedure, such as the elliptic-curve Diffie-Hellman (ECDH) key exchange protocol, that uses the public keys of the PRU in the embedded controller to establish and securely transmit a shared private key.

At block 415, an update to the firmware of the PRU microcontroller may be initiated. In certain embodiments, the embedded controller may digitally sign the firmware update using the assigned private key of the embedded controller. The embedded controller may then encrypt the firmware update using the shared private key that was negotiated using ECDH. At block 420, the encrypted and signed firmware update may be transmitted to the microcontroller of the PRU. In certain embodiments, the firmware update may fit within the I/O buffer utilized by the PRU and may thus be included in its entirety within a firmware update message that is received and buffered by the microcontroller of the PRU. However, in certain instances that support buffered communications, transmission of a firmware update to the PRU may require splitting the firmware payload into discrete chunks that conform to the buffer size utilized by the PRU. In such instances, the firmware payload may be reconstructed by the PRU microcontroller based on the buffered transmissions from the embedded controller.

The received firmware payload may be authenticated by the PRU at block 425. In scenarios where the firmware payload is not buffered, the firmware payload may be decrypted in its entirety by the PRU using the shared private key. The PRU may further confirm the authenticity of the decrypted firmware payload by validating the digital signature included in the firmware payload by the embedded controller. In certain embodiments, the PRU may utilize a public key corresponding to the private key of the embedded controller in order to confirm the authenticity of the digital signature. In scenarios where the firmware payload must be split into chunks and transmitted via buffering, certain embodiments may support iterative authentication of the firmware payload. For instance, as each chunk of the firmware payload is received by the PRU, the embedded controller may perform the digest calculation (such as using the SHA256 cryptographic hash function) on the received portion of the payload and maintaining the current state of the digest calculation in memory. The current state of digest calculation may be updated based on each incremental digest calculation. In this manner, the authentication of the firmware payload may be accomplished more quickly as each digest calculation is performed on a discrete portion of the firmware payload.

If the received firmware payload is successfully authenticated, at block 430, the firmware payload may be used to replace the firmware of the microcontroller of the PTU. However, in scenarios where firmware payload cannot be properly authenticated, or where the required buffering cannot be accommodated by the microcontroller of the PRU, at block 435, the delivered firmware payload may be marked as invalid for booting microcontroller. In such instances, the embedded controller may retrieve a known valid firmware image and may push this firmware image to the PRU for replacement of the invalid firmware payload. In certain embodiments, the microcontroller of the PRU may be disabled and configured in a "boot block" mode that requires updating the firmware of microcontroller before the PRU can be enabled. In certain embodiment, the microcontroller of the PRU may instead be configured in a "boot block image recovery" mode in which all functions of the PRU are disabled except for the ability to receive an updated firmware image.

In a similar manner, embedded controller may transmit firmware updates to the microcontroller of the PTU. In such embodiments, the embedded controller may initiate a key exchange with the PTU with the microcontroller of the PRU brokering the communications between the embedded controller and the PTU. The resulting shared secret key may be used by the embedded controller in order to encrypt the firmware update, and by the PRU in order to decrypt received firmware update. As with the firmware update of the PRU, the embedded controller may digitally sign the PTU firmware update and the PTU may use the public key of the embedded controller to validate the authenticity of the digital signature.

The cryptographic techniques included in the above embodiments utilize public key infrastructure (PKI) cryptography. It should be understood that other cryptographic techniques may be utilized without departing from the scope of the invention. It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for authenticating components of a wireless charging system, the method comprising:
   transmitting a first token to a wireless power reception unit (PRU);
   encrypting the first token using a private key of the wireless PRU, wherein the private key of the PRU used to encrypt the first token is encoded within cryptographic logic of the wireless PRU;
   authenticating the wireless PRU based on a decryption of the encrypted first token resulting in recovery of the first token;
   transmitting a second token to a wireless power transmission unit (PTU);
   encrypting the second token using a private key of the wireless PTU, wherein the private key of the PTU used to encrypt the second token is encoded within cryptographic hardware logic of the wireless PTU;
   authenticating the wireless PTU based on a decryption of the encrypted second token resulting in recovery of the second token;
   transmitting a first firmware payload to the wireless PRU; and
   transmitting a second firmware payload to the wireless PRU, wherein the second firmware payload is forwarded to the wireless PTU by the wireless PRU.

2. The method of claim 1, further comprising:
   terminating power to the wireless PRU when the decryption does not result in recovery of the first token.

3. The method of claim 2, further comprising:
   authorizing wireless charging by the wireless PTU at a reduced power level when the decryption does not result in recovery of the second token.

4. The method of claim 1, wherein the wireless PTU and the wireless PRU are authenticated by an embedded controller of an IHS (Information Handling System) receiving power from the wireless PRU.

5. The method of claim 4, wherein the embedded controller transmits the first token to a microcontroller of the wireless PRU and wherein the wireless PRU transmits the second token to a microcontroller of the wireless PTU on behalf of the embedded controller.

6. The method of claim 1, wherein the first firmware payload is encrypted using a private key generated by the embedded controller and provided to the microcontroller of the wireless PRU via a secure key exchange.

7. An Information Handling System (IHS) configured for authenticating components of a wireless charging system, the IHS comprising:
- a wireless power reception unit (PRU) operable to receive a wireless power transfer from a wireless power transmission unit (PTU);
- an embedded controller operable to:
  - transmit a first token to the wireless PRU;
  - receive an encrypted first token from the wireless PRU, wherein the encrypted first token is encrypted by the wireless PRU using a first private key encoded within cryptographic hardware logic of the wireless PRU;
  - authenticate the wireless PRU based on a decryption of the encrypted first token resulting in recovery of the first token;
  - transmit a second token to the wireless PTU;
  - receive an encrypted second token from the wireless PTU, wherein the encrypted second token is encrypted by the wireless PTU using a second private key encoded within cryptographic hardware logic of the wireless PTU;
  - authenticate the wireless PTU based on a decryption of the encrypted second token resulting in recovery of the second token;
  - transmit a first firmware payload to the wireless PRU; and
  - transmit a second firmware payload to the wireless PRU, wherein the second firmware payload is forwarded to the wireless PTU by the wireless PRU.

8. The IHS of claim 7, wherein the embedded controller is further operable to:
- terminate power to the wireless PRU when the decryption of the encrypted first token does not result in recovery of the first token.

9. The IHS of claim 8, wherein the embedded controller is further operable to:
- authorize wireless charging by the wireless PTU at a reduced power level when the decryption does not result in recovery of the second token.

10. The IHS of claim 7, wherein the embedded controller transmits the first token to a microcontroller of the wireless PRU and wherein the wireless PRU transmits the second token to a microcontroller of the wireless PTU on behalf of the embedded controller.

11. The IHS of claim 7, wherein the first firmware payload is encrypted using a private key generated by the embedded controller and provided to the microcontroller of the wireless PRU via a secure key exchange.

12. A system for authenticating wireless charging components, the system comprising:
- a wireless power reception unit (PRU) operable to receive a wireless power transfer from a wireless power transmission unit (PTU), and further operable to encrypt tokens using a first private key encoded within cryptographic hardware of the wireless PRU;
- the wireless PTU operable to encrypt tokens using a second private key encoded within cryptographic hardware of the wireless PTU;
- an embedded controller operable to:
  - transmit a first token to the wireless PRU;
  - receive, from the wireless PRU, an encrypted first token;
  - authenticate the wireless PRU based on a decryption of the encrypted first token resulting in recovery of the first token;
  - transmit a second token to the wireless PTU;
  - receive, from the wireless PTU, an encrypted second token;
  - authenticate the wireless PTU based on a decryption of the encrypted second token resulting in recovery of the second token;
  - transmit a first firmware payload to the wireless PRU; and
  - transmit a second firmware payload to the wireless PRU, wherein the second firmware payload is forwarded to the wireless PTU by the wireless PRU.

13. The system of claim 12, wherein the embedded controller is further operable to: terminate power to the wireless PRU when the decryption of the encrypted first token does not result in recovery of the first token.

14. The system of claim 13, wherein the embedded controller is further operable to: authorize wireless charging by the wireless PTU at a reduced power level when the decryption does not result in recovery of the second token.

15. The system of claim 12, wherein the embedded controller transmits the first token to a microcontroller of the wireless PRU and wherein the wireless PRU transmits, on behalf of the embedded controller, the second token to a microcontroller of the wireless PTU.

16. The system of claim 12, wherein the first firmware payload is encrypted using a first shared key generated by the embedded controller and provided to the microcontroller of the wireless PRU via secure key exchange.

17. The system of claim 16, wherein the second firmware payload is encrypted using a second shared key generated by the embedded controller and provided, by the wireless PRU acting on behalf of the embedded controller, to the microcontroller of the wireless PTU via secure key exchange.

* * * * *